US008060933B2

(12) United States Patent
Fang (10) Patent No.: US 8,060,933 B2
(45) Date of Patent: Nov. 15, 2011

(54) COMPUTER DATA PROTECTING METHOD (76) Inventor: Ko-Cheng Fang, Taipei County (TW)

(*) Notice: Subject to any disclaimer, the term of this patent is extended or adjusted under 35 U.S.C. 154(b) by 1069 days.

(21) Appl. No.: 11/053,231

(22) Filed: Feb. 9, 2005

(65) Prior Publication Data
US 2006/0041757 A1 Feb. 23, 2006

Related U.S. Application Data (63) Continuation-in-part of application No. 10/923,921, filed on Aug. 21, 2004.

(51) Int. Cl.
G06F 7/04 (2006.01)
G06F 11/00 (2006.01)

(52) U.S. Cl. ............ 726/22; 726/2; 726/28; 713/183; 713/187

(58) Field of Classification Search .......... 713/1–2, 713/150–152, 164–167, 182–183, 187–189; 726/2, 16–17, 22, 26–30; 714/4.11, 4.2, 714/21, 48–49
See application file for complete search history.

(56) References Cited

U.S. PATENT DOCUMENTS

| | | | | | |
|---|---|---|---|---|---|
| 4,719,566 | A | * | 1/1988 | Kelley .................... | 340/5.27 |
| 5,475,839 | A | * | 12/1995 | Watson et al. ................ | 713/2 |
| 5,768,564 | A | * | 6/1998 | Andrews et al. ............... | 717/137 |
| 5,809,230 | A | * | 9/1998 | Pereira ........................ | 726/35 |
| 6,044,155 | A | * | 3/2000 | Thomlinson et al. ......... | 713/155 |
| 6,044,471 | A | * | 3/2000 | Colvin ........................ | 726/28 |
| 6,134,659 | A | * | 10/2000 | Sprong et al. ................ | 713/190 |
| 6,668,325 | B1 | * | 12/2003 | Collberg et al. ............. | 713/194 |
| 6,804,778 | B1 | * | 10/2004 | Levi et al. .................... | 713/176 |
| 6,836,883 | B1 | * | 12/2004 | Abrams et al. ............... | 717/140 |
| 2002/0033838 | A1 | * | 3/2002 | Krueger et al. .............. | 345/700 |
| 2002/0157021 | A1 | * | 10/2002 | Sorkin et al. ................. | 713/201 |
| 2002/0196274 | A1 | * | 12/2002 | Comfort et al. .............. | 345/741 |
| 2003/0009687 | A1 | * | 1/2003 | Ferchau et al. .............. | 713/200 |
| 2003/0028761 | A1 | * | 2/2003 | Platt ............................. | 713/150 |
| 2003/0131002 | A1 | * | 7/2003 | Gennetten et al. ........... | 707/10 |
| 2003/0154468 | A1 | * | 8/2003 | Gordon et al. ............... | 717/143 |
| 2003/0208694 | A1 | * | 11/2003 | Fang ............................ | 713/201 |
| 2003/0236986 | A1 | * | 12/2003 | Cronce et al. ................ | 713/189 |
| 2004/0003380 | A1 | * | 1/2004 | Fedorov ....................... | 717/148 |
| 2004/0236884 | A1 | * | 11/2004 | Beetz ........................... | 710/68 |
| 2005/0183072 | A1 | * | 8/2005 | Horning et al. .............. | 717/140 |
| 2006/0037075 | A1 | * | 2/2006 | Frattura et al. ............... | 726/22 |
| 2006/0064758 | A1 | * | 3/2006 | Petner et al. ................. | 726/26 |
| 2007/0028292 | A1 | * | 2/2007 | Kabzinski et al. ........... | 726/2 |
| 2007/0234070 | A1 | * | 10/2007 | Horning et al. .............. | 713/190 |

OTHER PUBLICATIONS

Stang, David J.; "Comparison: Products to Detect Changes to Programs"; 1991; National Computer Security Association.*

(Continued)

Primary Examiner — Kim Vu
Assistant Examiner — Darren B Schwartz
(74) Attorney, Agent, or Firm — Rabin & Berdo, P.C.

(57) ABSTRACT

This computer data protection method of the present invention requires a user to enter a correct password for modifying any data. If wrong passwords are typed, this method forbids modification of any program modules. Further, if any program module is detected having unauthenticated modification, that program module is deleted and an original image of that program module is loaded to recover normal operation of the operation system. Additionally, a common password is also provided in the protection method. Some special function can use this common password to pass the detection of this method to perform any modification.

8 Claims, 7 Drawing Sheets

OTHER PUBLICATIONS

McAfee Security, "McAfee Internet Security Suite—Version 6.0," Jun. 2003, Networks Associates Technology, Inc.*

"Fortres 101 Version 5.0." 2003, Fortes Grand Corporation.*

"Folder Guard," WinAbility.com, fguard.hlp, retrieved www.archive.org, Apr. 1, 2003, p. 11.*

"Microsoft, Computer Dictionary, Fifth Edition," 2002, Microsoft Corporation, pp. 115-116.*

"Folder Guard," WinAbility.com, fguard.hlp, retrieved www.archive.org, Apr. 1, 2003, pp. 9 and 43.*

U.S. Appl. No. 60/552,000.*

U.S. Appl. No. 60/552,000, filed Mar. 10, 2004.*

\* cited by examiner

COMPUTER DATA PROTECTING METHOD

CROSS-REFERENCE TO RELATED APPLICATIONS

This application is a continuation-in-part of U.S. application Ser. No. 10/923,921, filed on Aug. 21, 2004 hereby incorporated by reference as it fully set forth herein.

FIELD OF INVENTION

The present invention relates to a security method, and particularly relates to a computer data security method.

BACKGROUND OF THE INVENTION

With the popularity of computer and the progress of the network technology, computers have been closely involved in human daily life. For example, people can use computer to record various digital data. Even people can use the duplicating machine of the computer to reproduce the same digital data in a digital recording media.

Most computers are connected to networks like the Internet, intranets, and telecommunication networks. In other words, networks have become an unavoidable tool in life. However, a network also exposes users thereof to various attacks. For example, data on the network can be destroyed, changed, or copied by hackers. When the hacker gets the data, he can employ the reproduction function to reproduce the data and even sell the data. There are many transferring and copy preventing technology developed to avoid security data is spread. However, these new safeguarding approaches have failed due to market acceptance issues.

On the other hand, since the computers have bigger amount of data, and is more frequently interacted with networks, the problem of computer virus is also more and more serious. Once a computer virus invades, at least the inconvenience of daily life or work is caused, and more severely, the life or property loss is likely to be caused.

Typically, a firewall system is used to filter information and control access and an anti-virus program is used to block computer viruses from network or other hacker. There are two types of firewall systems, software firewall systems and hardware firewall systems. These firewall systems allow a system administrator to set certain safety conditions. For example, the firewall systems can be configured so that data packets from unknown addresses are filtered out, or some transmission ports of certain protocols are closed. However, all these approaches only focus on stopping first stage hacker attacks. Once the hacker satisfies a safety condition, the hacker can enter the network and do as he or she pleases. Hackers often try to break a security system by repeatedly testing passwords. Current firewall systems fail to detect and respond properly to this sort of early stage hackers in the early stage and respond properly. Once a hacker breaks the firewall system, the hacker also destroys all hacking data at the same time. In the other hand, simple attempt to test passwords for login cannot bring the hacker to legal resolution because the hacker does not do anything bad yet. Therefore, there are needs for improving the network security systems nowadays.

On the other hand, Most of the anti-virus programs are designed by analyzing the patterns of various virus codes; storing the patterns into a database used for scanning and detecting viruses. The virus technology is changed with each passing day, wherein the method for virus propagation is evolved from attachment in execution files in early days to attachment in e-mails, so that the database storing the virus codes is bigger and bigger. It can be imagined that when the database become enormous later, each scanning time will be very long, and the computer normal operation will be seriously effected. Under this vicious circle, even if the computer's hardware and software have stronger function, the efficacy thereof cannot be substantially promoted due to computer viruses, and users may be held back against the over-complicated system aforementioned.

Further, users also need to renew the virus database, or the anti-virus programs cannot be used to guard the computer security. Although some computer users may be interested in computer security and are willing to follow the related information timely, yet more computer users may be totally uninterested therein and do not have time to renew the anti-virus programs.

Hence, it is a very important task regarding how to develop a guarding computer security system and method to avoid the attack from hacker and resolve the computer virus problems. Additionally, there are needs for inhibiting the unauthorized digital media is reproduced.

SUMMARY OF THE INVENTION

Therefore, one purpose of the present invention is to provide a data protection method that is able to respond properly to activities of hackers in the early stage. The response of the system includes recording the activities of unauthorized users or activating certain reactions.

Another purpose of the present invention is to provide a data protection method for preventing a computer from virus attack.

Yet another purpose of the present invention is to provide a data protection method to prevent the unauthorized digital media reproduced.

According to the present invention, a user request is transmitted to the inner data system via the redirect system if the user request satisfies a certain safety condition. Otherwise, the user request is transmitted to a reaction system which provides virtual data similar to real data so that unauthorized users have the illusion of successfully hacking the inner data system. Meanwhile, the illegal activities are recorded and certain programs like Trojan programs can be used for executing reactions.

Additionally, the present invention provides a monitor program comprising the following steps. At first, a monitor program is designed with respect to an operating system, i.e. an anti-virus program. The monitor program monitors a plurality of program modules of the operating system so as to detect if the system functions have any modification. Further, the system initialization also includes allowing a user to assign a set of passwords used for verifying if there is a privilege to modify system files. Thereafter, during the computer operation process, if any modification/addition/deletion action is performed onto the program modules of the operating system, the monitor program asks the user to enter the set of passwords. If the set of passwords is missing, the monitor program forbids any modification/addition/deletion action to be performed onto the program modules. On the contrary, if the set of passwords is authenticated, the changing action of modification/addition/deletion is allowed, and is also recorded as a basis for determining if the changing action is legitimate.

Besides, when the monitor program detects the program modules having unauthenticated modification, the monitor program deletes the program modules and loads the backup images of the program modules so as to recover the computer back to normal operation.

On the other hand, a common password is also provided in the monitor program. The main purpose of the common password is to make some special function with this common password that can be performed in any computer but not performing the password authentication step. In other words, this virus can use the common password to pass the detection of the monitor program to perform any program modification.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention. In the drawings.

DETAILED DESCRIPTION OF THE PREFERRED EMBODIMENT

Figure 1:
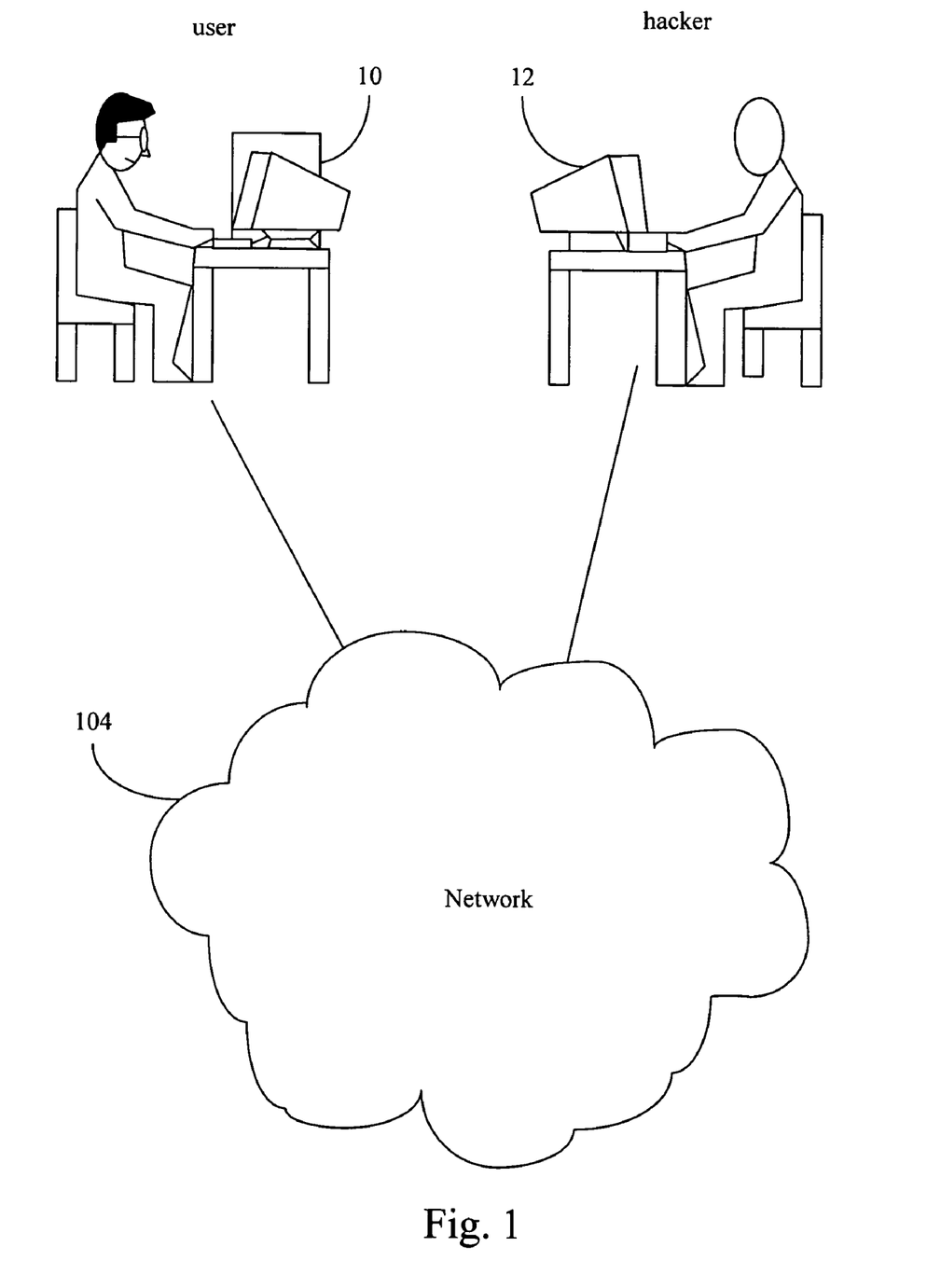
FIG. 1 illustrates a basic network structure.

FIG. 1 illustrates a basic network structure. When a user 10 connected with the network 104, there is a probability of the data stored in the computer belonging to the user 10 being stolen or destroyed by a hacker 12 through the network 104. For example, the hacker 12 can browse the stored data through the network 104 if he can decode the password. Moreover, the hacker also can design and spread viruses on a network 104, and files carrying the viruses are downloaded while the user 10 through the network 104. When these files carrying the viruses are loaded back to the computer of the user 10, under certain situations, such as the infected files or macros are executed, the viruses further sneak into program modules of an operating system and waits to break out so as to damage the computer. Therefore, the present invention provides a system and method for preventing the attack from the hacker.

When a hacker spreads viruses on a network to attack the computer, the present invention provides a system and method for preventing computer from virus attacks.

Figure 2:
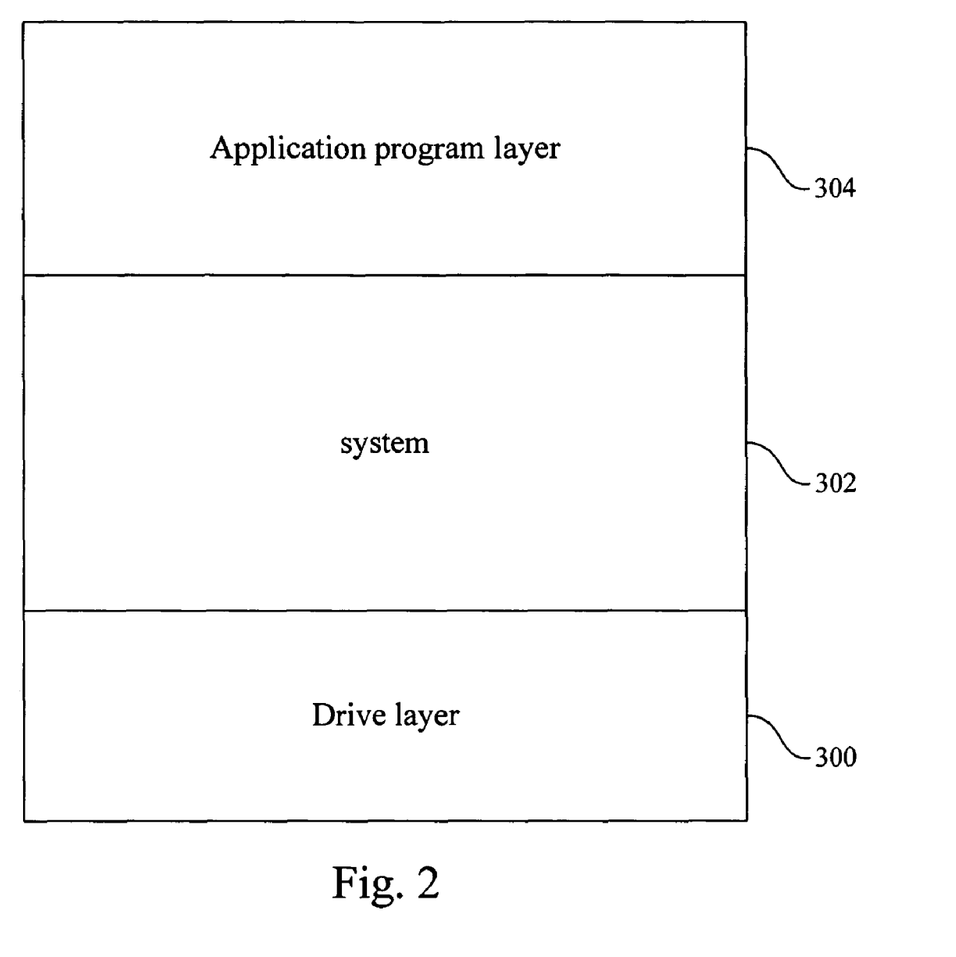
FIG. 2 is a schematic diagram showing an invaded software system.

Please refer to FIG. 2. Generally speaking, a computer software system includes a driver layer 300, an operating system layer 302 and an application program layer 304, wherein each of the three layers is responsible for different jobs, and yet the three layers have to tightly work together so as to accomplish the jobs requested by a user. The driver layer 300 is generally designed and developed by different kinds of hardware vendors, and the application program layer 304 is developed for various user applications, and the operating system layer 302 acts as an important bridge between the application program layer 304 and the drive layer 300. With the use of program calls in the operating system layer 302, the designers of the application program layer 304 do not need to take care of all the hardware details, and can be sorely focused on designing and completing the jobs to be processed.

The operating system layer 302 is generally composed of many program modules. For example, Microsoft operating systems are the most popularly used in personal computers, and are composed of huge program modules packed into a series of system files, and those system files are loaded into memory for executing related jobs in accordance with the requests while the operating system is in execution.

However, when virus codes of the computer virus are executed, the virus codes will alter the program modules in the operating system layer 302 so as to intercept or change the normal operation of the original program modules. Briefly speaking, the computer is infected by the virus.

Figure 3:
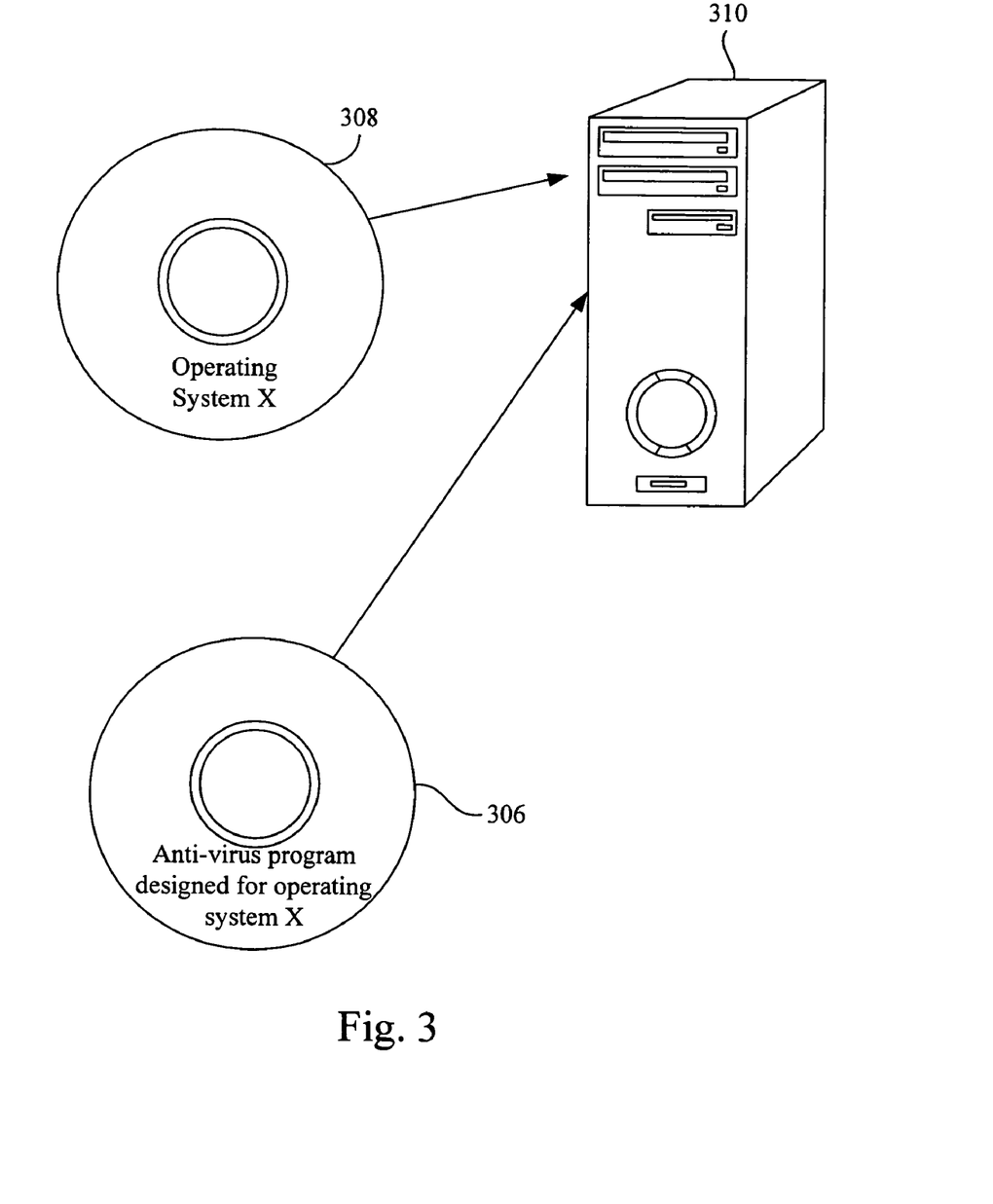
FIG. 3 is a schematic diagram showing the external relationship of an embodiment of the present invention.

FIG. 3 is a schematic diagram showing an anti-virus system according to the preferred embodiment of the present invention. At first, a user loads an operating system 308 into a computer 310. After installation, the user further loads an anti-virus program 306 particularly designed for the operating system 308 into the computer 310. For example, when Microsoft publishes Windows 2000 operating system, the user has to purchase an anti-virus program corresponding to Windows 2000 operating system. The following description is stated for explaining how to use the anti-virus program 306 to perform a detection and anti-virus job.

Figure 4:
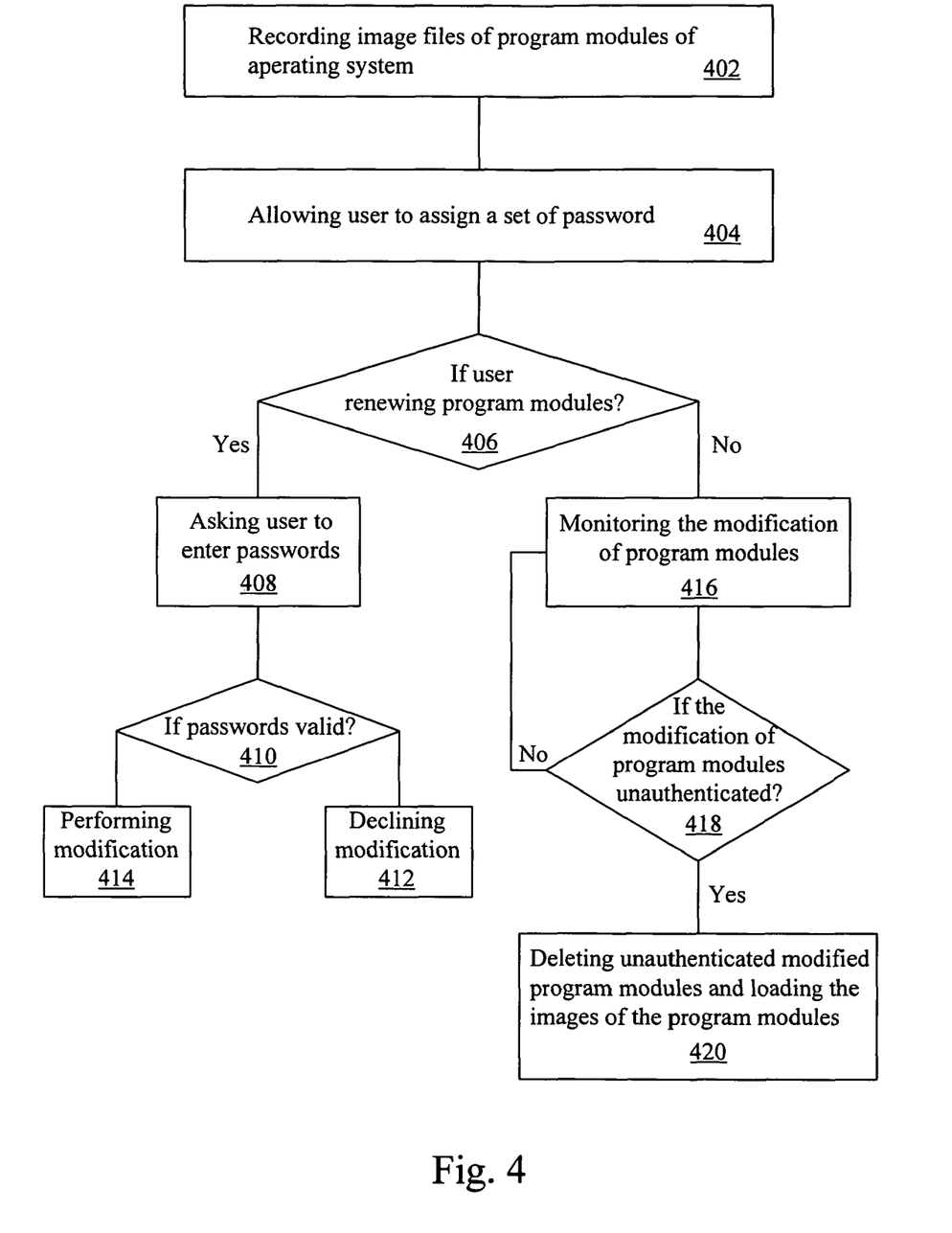
FIG. 4 is a flowchart showing the implementation of the program of an embodiment of the present invention.

FIG. 4 is a flowchart showing the operation of the anti-virus program 306.

At first, the anti-virus program 306 records image files of the program files of the operating system (step 402). With regard to this step, the image files of the specific operating system can be backed up in advance. The other method for preparing this step is to enable the anti-virus program 306 dynamically to search for which files are used for storing the program files of the operating system 308 by such as file extension names after the operating system is installed; and to record the images of the files searched in the mode of data compression or uncompression. In order to rapidly detect if the program modules have been altered, a hash function can be additionally used to compute and obtain an index with respect to system files, and thus the index can be used for comparison so as to rapidly detect if the program modules have been altered.

Thereafter, the anti-virus program allows the user to assign one or more user password (step 404), and the password is used for verifying the user's privilege as the basis for altering the aforementioned program modules. When data is connected with the network, for avoiding the data being stolen by a hacker, one user password is required to confirm the user so as to browse the data and alter the data. However, the identifying step is performed by a confirmation software that is composed of a program language. For avoiding the software being dissolved by a hacker and breaking the password protection mechanism, a special encoding method is used to encode the original code of the confirmation software to reject the hacker dissolving.

Typically, each program language requires a corresponding compiler to compile. For example, program language "A" requires compiler "A" to compile. Program language "B" requires compiler "B" to compile and so on. However, this present invention breaks the special relationship between program language and compiler so as to improve the decoding difficulty for a hacker. The present invention first re-arrange the code of the program language used in the confirmation software. Then, the re-arrange code is transferred to another code of similar program language. Finally the transferred code is compiled by using the compiler of the similar program language. On the other hand, according to the present invention, these program modules also can use different program language to design. However, a same compiler is used to compile these program modules.

When a hacker wants to dissolve the confirmation software, it is necessary for the hacker to guess the type of the complier first. Next, according to the guessed complier, an anti-compiling process is performed to return to the original re-arranged code. Then, the re-arranged code is re-arranged again to return to the original code of the confirmation software. Accordingly, although a same program language is used to develop the operation system and confirmation software, different compliers are used to compile the operation system and confirmation software. Such compiling method may cause the hacker take a wrong road to dissolve the software. It is noticed that the above method can be used to design other program modules so as to improve the protection function. For example, a different program language is used to design a special function, such as delete function.

Figure 5:
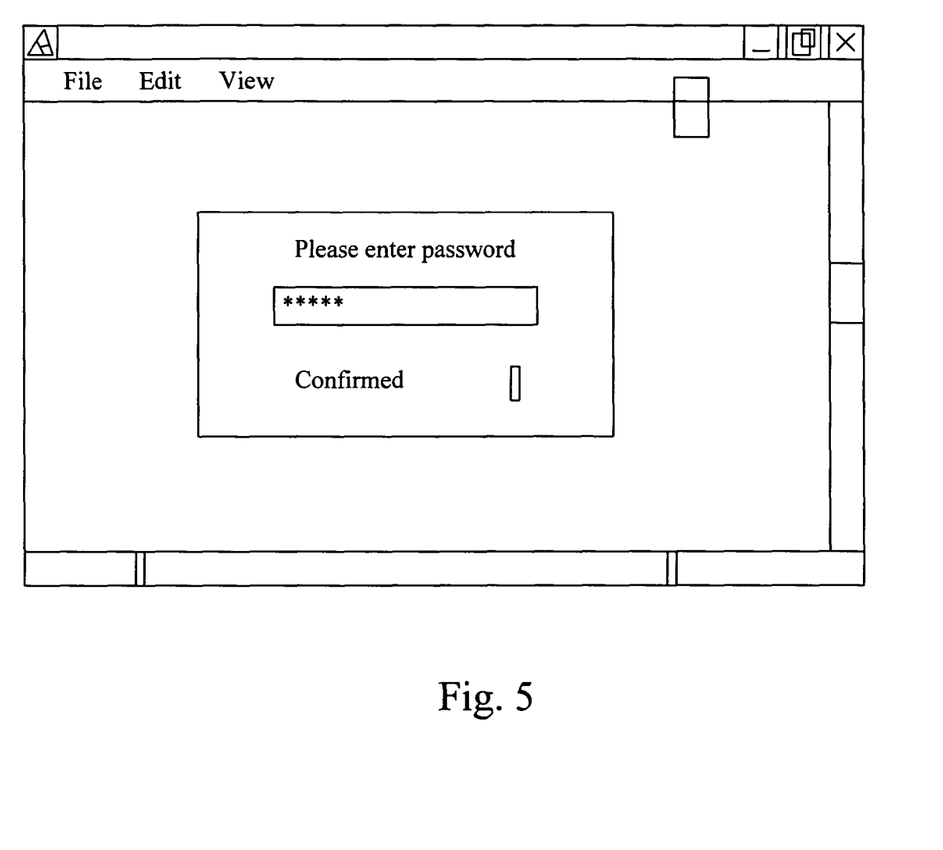
FIG. 5 is a display schematic diagram illustrating that a user is asked to enter a set of passwords for confirmation.

The description stated above is the fundamental step of system configuration. Thereafter, when the user wants to renew any one of the aforementioned program modules (step 406), the anti-virus 306 shows a suggestive window and asks the user to enter the passwords for authentication (step 408), such as shown in FIG. 5. In order to perform this type of monitoring mission, the anti-virus program 306 needs a permanent part to be in charge of intercepting the operation used for altering the program modules. With regard to this point, one method therefor is to enable the anti-virus program 306 to intercept the file operation interface of the operating system, such as in a Windows operating system, an interception action is performed on an API of file operation, and an inspection action is made to check if the altered file is a system file existing in the record and having the aforementioned program modules.

If the user enters incorrect passwords, the anti-virus program 306 declines the modification of the program modules (step 412), or on the contrary, the anti-virus program 306 allows the modification of the program modules (step 414). Further, the anti-virus program 306 renews the database, and saves the data of the new program modules as legitimate reference data.

Besides performing password authentication step onto the interceptable modification of the program modules, the anti-virus program 306 also monitor the program modules periodically or whenever the computer is started (step 416), so as to check if there is any unauthenticated modification/addition/deletion action (step 418). If any modification/addition/deletion action is found, then the program modules are determined to be infected by viruses, and thus the program modules are deleted, and images of the program files are reloaded to the operating system so as to recover the operating system back to normal operation.

Additionally, the user password is also used to be an identification number of this computer. In other words, when this computer is connected to the Internet, utilizing this user password can sure which computer is connected to this Internet. However, for avoiding two computers use a same user password to be the identification number, predetermined identification numbers can be arranged to computers. In other words, each computer has a special identification number. Therefore, according to the predetermined identification numbers, it is easy to sure which computer is connected to the Internet.

Figure 6:
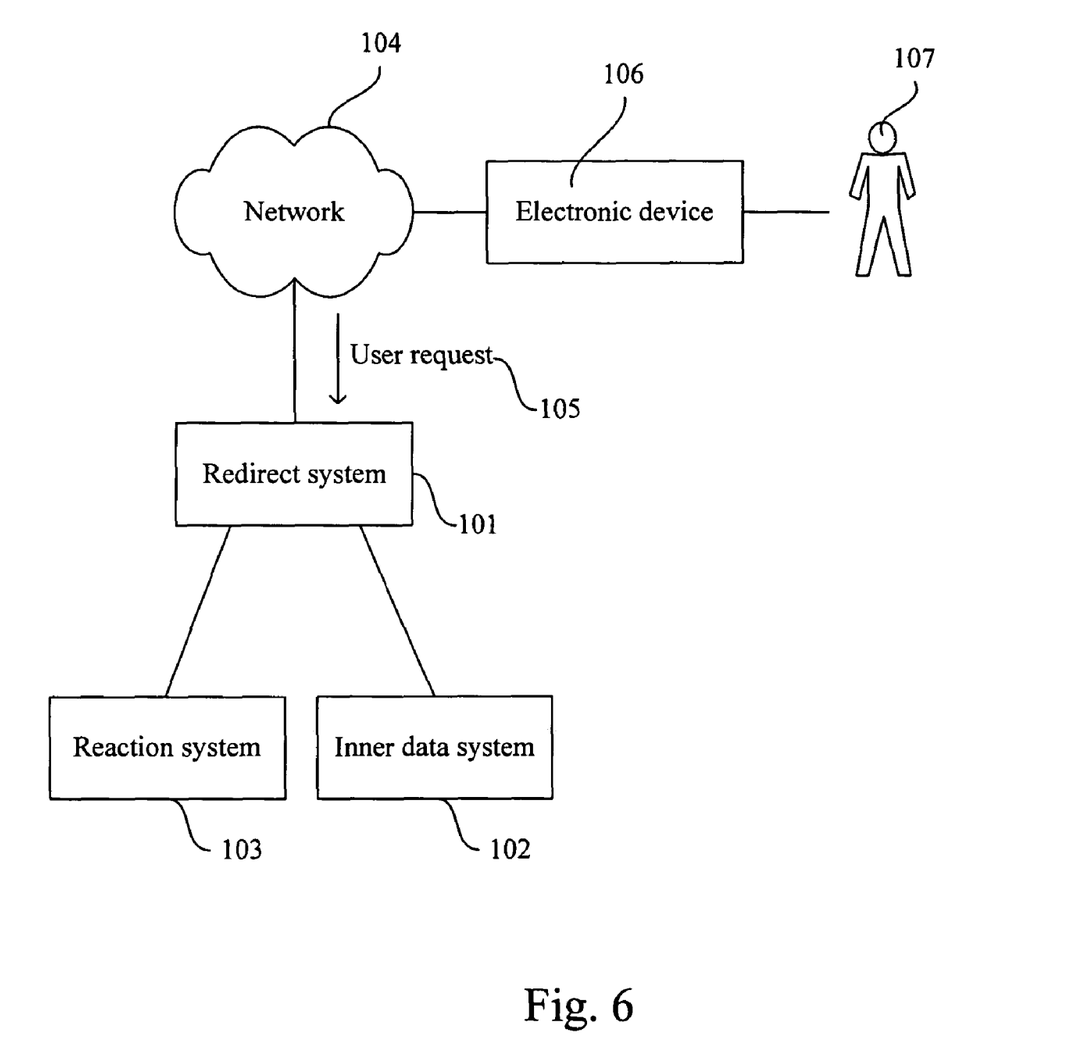
FIG. 6 illustrates a protect system for preventing the hacker to browse the stored data according to the preferred embodiment of the present invention.

The method of arranging predetermined identification numbers to computers can be used in any computer system to prevent attacking from a hacker. FIG. 6 illustrates a protect system for preventing the hacker to browse the stored data in a computer according to the preferred embodiment of the present invention. A redirect system 101 is connected to an external network 104, an inner data system 102, and a reaction system 103 respectively. According to the present invention, a predetermined identification number or a user password is arranged to this computer.

Figure 7:
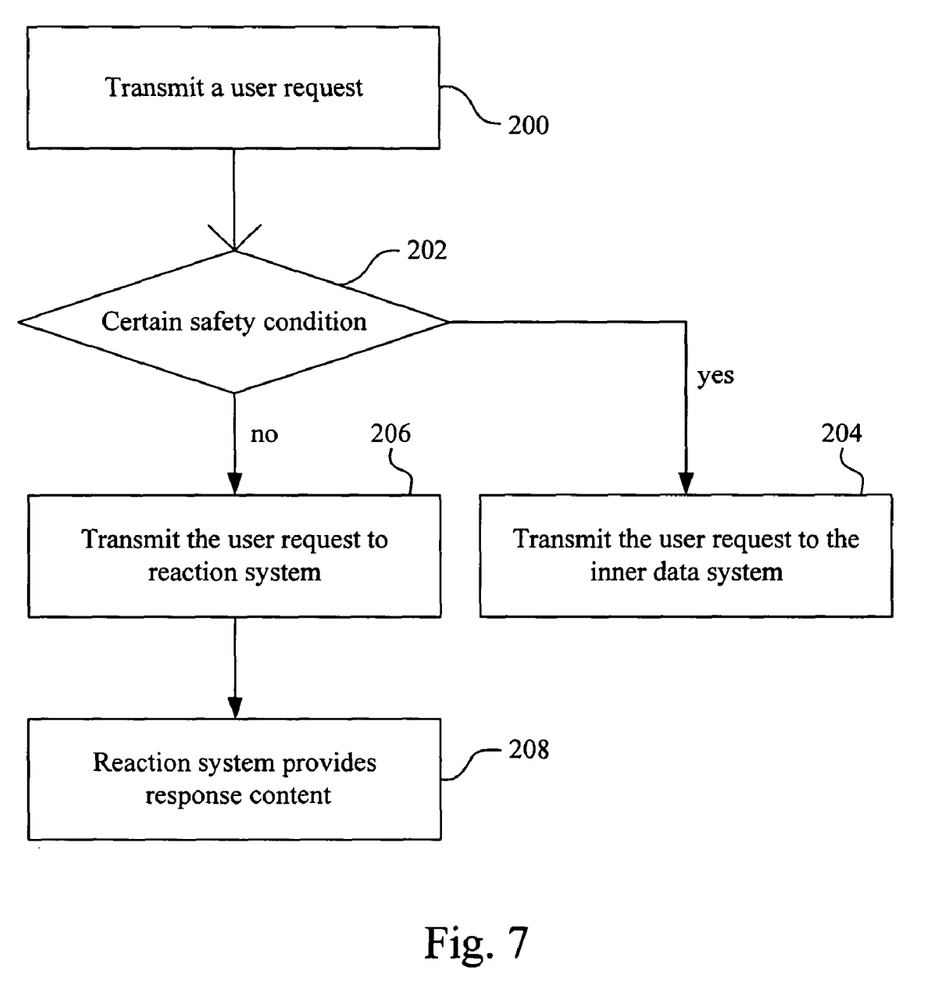
FIG. 7 is an operation flowchart of the preferred embodiment.

FIG. 7 is an operation flowchart of the preferred embodiment. With simultaneous reference to both FIG. 6, in normal situation, a user 107 uses an electronic device 106, e.g. a computer, transmits a user request 105 to the redirect system 101 via the external network 104 (step 200). If the user request 105 satisfies a certain safety condition (step 202), the redirect system 101 then transmits the user request 105 to the inner data system 102 (step 204) for further processing. Examples of the redirect system 101 include IP sharing devices, hardware firewall systems, software firewall systems or other systems having transmission ability according to certain protocols. Examples of the inner data system 102 include web servers, file servers, and any server or machine that provides users data under request.

However, if the user request 105 fails to satisfy the safety condition (step 202), which means unauthorized activity is occurring, the redirect system 101 does not reject the user request 105 directly. Instead, the user request 105 is transmitted to the reaction system 103 (step 206). The reaction system 103 then provides the user response contents according to the user request 105 with a predetermined method (step 208).

The response contents are adjusted so that they have the same format as what the inner data system 102 would provide the user according to the user request 105.

In other words, unauthorized users 107 fall under an illusion that they have successfully hacked the system because the reaction system 103 provides the unauthorized users 107 with data having a format similar to that of real data. If the unauthorized users continue illegal activities, the reaction system 103 records these activities and executes various reactions, such as calling the police and tracing related data of the unauthorized users 107, the computer ID. Accordingly to the present invention, since each computer has a special identification number or user password, the unauthorized users 107 can be traced according to its identification number or user password. On the other hand, even though the unauthorized users 107 use public computers, the management of the public computers is required to be responsible to the illegal activities of the unauthorized users 107 if these illegal activities happens in his management. Therefore, the present invention can also push the management to do his best to monitor any illegal activities. In other words, the present invention indirectly improves the Internet security.

On the other hand, according to the present invention, the important data, such as confidential data, are stored in the inner data system 102, but not the reaction system 103, and therefore, the embodiment is able to record and respond properly to unauthorized activities with no risk to the important data.

The reaction system 103 can be coupled to the redirect system 101 and the inner data system 102 separately or together. The redirect system 101 can be coupled to redirect system 103 and the inner data system 102 separately or together. The inner system 102 can also be coupled to redirect system 101 and the reaction system 103 separately or together.

In addition, connections between the redirect system 101, reaction system 103, inner data system 102 and external system 104 can be of wire, wireless, direct, or indirect forms. Further, the inner data system 102 can be a plurality of inner servers and is not limited in number to one.

In addition, the external network 104 and the internal network 109 can be the Internet, intranets, wireless networks, telecommunication networks, and other similar networks. The user request 105 include file transfer protocols (FTP), hypertext transfer protocols (HTTP), network neighboring and others based on IP packets.

Examples of the redirect system 101 include hardware firewalls and software firewalls, and IP sharing devices. The inner data system 102 includes web servers, file servers, database servers and personal computers. The electronic device 106 includes personal computers, personal digital assistant, mobile phones and workstations.

Examples of the aforementioned safety condition include determining whether number of login attempts using an invalid password has exceeded a predetermined limit and receiving an unknown identification code from machine 106. The safety condition can also be set as a portion of commands for accessing data by system administrators, for example, a subset of commands or instructions in HTTP but not all being allowed.

The predetermined reaction method of the reaction system 103 can also be set by a system administrator, or be configured directly in the reaction system 103. In addition, the predetermined reaction method of the reaction system 103 can also be set to record illegal activities of unauthorized users and therefore, legal action can be brought against unauthorized users. Further, the predetermined reaction method of the reaction system 103 can also include tracing the user 107 to obtain related data such as an IP address.

The response contents provided by the reaction system 103 include virtual data similar to real data in the inner data system 102 so that these virtual data do not reveal any confidential information. Further, the response contents can include tracing programs like Trojan programs which run in the user's computer.

Further, so as to ensure sufficient bandwidth of the network for normal communications, the redirect system 101 in another embodiment according to the present invention has a management interface so that system administrators can set a maximum number for reacting unauthorized users. When the unauthorized attempts exceed the maximum number, the attempts are rejected.

Additionally, a detect mechanism is also provided by the present invention. Because each computer system has a special identification number in the present invention, the management interface can set a bandwidth for each computer according to its identification number. Once the authorized attempts exceed the set bandwidth, the attempt is also rejected. In other words, the present invention may further control the bandwidth arrangement. The connection requirement are directly rejected when over the set bandwidth even though the requirement is from an authorized user. Therefore, the present invention may avoid this attack by sending a lot of message.

On the other hand, the present invention also provides a preventing reproducing digital recording media method and system thereof. According to the method, a virus that can destroy the copy function of the computer is spread in the digital data and built in the rails of the digital recording media. In other words, the digital data stored in the digital recording media includes a virus for destroying the copy function. When a user wants to reproduce this digital recording media through the computer, this virus is loaded into the computer to destroy the copy function result in the reproduction failing.

However, according to the present invention, when program modules are modified, the monitor program requires the user to input the set user password. If wrong passwords are typed later, the monitor program forbids modification of these program modules. In other words, the copy function destroying virus can not work in this situation because any modification is rejected under the monitor program monitoring.

Therefore, an additional common password is set in each computer system. The main purpose of the common password is to make some special function with this common password that can be performed in any computer but not performing the password authentication step. In other words, this virus can use the common password to pass the detection of the monitor program to perform any program modification. Therefore, when a virus with the common password is spread in the digital recording media and is loaded into a computer, the copy function of this computer is destroyed by this virus result in a reproduction failing.

Additionally, the common password can be also used to destroy the browse function of a computer of a hacker. For example, a browse function destroying virus with the common password is spread in the reaction system as shown in the FIG. 2. When a hacker enters a computer system and is redirected into the reaction system, this virus is loaded into the computer belonging to the hacker to destroy the browse function. In other words, even though the monitor program described in the present invention is installed into this computer belonging to the hacker, this browse function destroying virus can use the common password to pass the detection of the monitor program to destroy the browse function.

On the other hand, since each computer has a special password, it is necessary to resolve each password for the hacker to spread virus through the Internet. In other words, the virus is not spread through the Internet if the hacker only resolves a few computer passwords.

As a whole, according to the present invention, a special identification number that can be a predetermined number or a user set number is arranged in each computer. Utilizing this special number, this computer system of the present invention can trace the hacker through a reaction system. When a hacker enters this computer system and input a wrong password, the redirect system direct the hacker to enter a reaction system to browse wrong data and trace this computer used by this hacker by the identification number. Since each computer has a special identification number, the user can be easily traced by tracing the identification number.

Additionally, the system also provides a monitor program to record images of program modules of an operating system. Users set passwords to the monitor program for authentication when the program modules of the operating system are modified. If wrong passwords are typed later, the monitor program forbids modification of these program modules. Further, if any program module is detected having unauthenticated modification, that program module is deleted and an original image of that program module is loaded to recover normal operation of the operation system. Additionally, a common password is also provided in the computer system. Some special function can use this common password to pass the detection of the monitor program.

Those skilled in the art will readily observe that numerous modifications and alterations of the device may be made while retaining the teaching of the invention. Accordingly, the above disclosure should be construed as limited only by the metes and bounds of the appended claims.

What is claimed is:

1. A method for protecting a computer device to ensure its proper operation and its proper data, said method comprising the steps of:

monitoring by a monitor program, user activities on the computer device, the activities including attempts to modify, add, and delete any of files and program modules, the program modules including system files of an operating system;

encoding the monitoring program into a first monitoring code expressed in a first language, re-arranging the first monitoring code into a second monitoring code expressed in a second language that is similar to the first language;

confirming by a confirming program whether a predetermined identification number assigned to the computer device and at least one of a user's passwords are received when the monitoring step detects that a user attempts to modify, add to, or delete any of the files and the program modules;

judging that the predetermined identification number and the at least one of the user's passwords are received, encoding the confirming program along with the predetermined identification number and the at least one of the user's passwords into a first confirming code expressed in the first language, re-arranging the first confirming code into a second confirming code expressed in the second language that is similar to the first language, wherein the second monitoring code and the second confirming code are compiled by a same compiler, and when during the confirming step the predetermined identification number and the at least one of the user's passwords are not received, then rejecting the user's attempts to modify, add to, or delete any of the files and the program modules, directing the user as an unauthorized user to a reaction system, providing by the reaction system the unauthorized user with response contents of virtual data, which have same data format as the files and the program modules, so as to provide the unauthorized user with false information that the unauthorized user has successfully accessed the files and the program modules, the response contents including any of tracing programs that includes Trojan programs, recording the user's attempts to modify, add to, or delete any of files and virtual program modules, and tracing the unauthorized user by the predetermined identification number or the at least one of the user's passwords so as to obtain data related to the unauthorized user, the related data including the unauthorized user's IP address.

2. The method of claim 1, further comprising the steps of:
automatically creating backup copies of the files and the program modules prior to an initial start of the monitoring of the computer device;
automatically scanning through currently loaded files and program modules, and comparing each of the currently loaded files and the currently loaded program modules with their respective backup copies among the backup copies, during a computer startup phase;
confirming, during the startup phase, whether any of the currently loaded files and the currently loaded program modules have been illegally modified;
deleting any of the currently loaded files and the currently loaded program module that are detected to be illegally modified; and
re-loading, for each of the deleted files and the deleted program modules, with their respective backup copies to restore the computer device to a previous normal operation thereof.

3. The method of claim 1, further comprising the steps of:
adding one of newly modified files and newly modified program modules; and
replacing a respective existing backup copy among the backup copies with the added one when the predetermined identification number and the at least one of the user's passwords are received during the confirming step.

4. The method of claim 2, wherein
the scanning step includes scanning the computer device periodically, and
the confirming step includes comparing file size, modification time, or file indices generated using a Hash function, between each of the currently loaded files and the currently loaded program modules, and their respective backup copies.

5. A method for protecting a computer device to ensure its proper operation, said method comprising the steps of:
installing an operating system on the computer device;
creating image file records of a plurality of program modules of the operating system;
assigning one or more passwords to a user, the one or more passwords of the user being a basis for authenticating an authorization by the user to modify the program modules;
after an allowing step has been encoded into an allowing source code, translating by a first compiler, the allowing source code into a first code expressed by a first language that is similar to the source language;
monitoring by a monitoring program, the program modules of the operating system, and intercepting any modification to the program modules;
encoding the monitoring program into a monitoring source code expressed in the source language, and then translating by a second compiler, the monitoring source code into a second code expressed by a second language that is different from the source language, wherein the first code and the second code are compiled by a same compiler;
preventing an attempt to add to, modify or delete the program modules when the user has not entered a correct password or the number of times of entering incorrect common passwords has exceeded a pre-determined number;
redirecting, after the preventing step, a request of the user to a reaction system by a redirecting system, wherein the redirecting system comprises a management interface;
setting, by the management interface, a maximum number for unauthorized users to connect to the redirecting system before being rejected, and a bandwidth usage limit of the user, and rejecting the user when a bandwidth usage of the user exceeds the bandwidth usage limit of the user;
providing, by a reaction system, the user with a virtual response content that is similar to original program modules;
recording, by the reaction system, stealing, modification and destruction action of the user; and
verifying, every time when the computer device starts up and loads one or more program modules, whether each of the currently loaded program modules is modified with an unauthenticated authorization, by scanning through the currently loaded program modules and comparing each of the currently loaded program modules with their respective backup copies among original program modules, deleting, when detecting that the currently loaded program modules are modified with an unauthenticated authorization, the modified program modules and loading their respective backup copies of the original program modules, and restoring normal operation of the operating system.

6. The method of claim 5, wherein the verifying step comprises periodically scanning and verifying the computer device before starting up the computer and,
wherein the comparing step comprises comparing file size, time of modification, or an index obtained through a Hash function.

7. The method of claim 5, further comprising the step of:
allowing, when the user enters a correct common password, the user to perform any addition, modification and deletion of the program modules, and replace, when the user modifies a program module, a backup copy of an original program module respective to the modified program module, with the modified program module.

8. The method of claim 5, wherein the reaction providing step further comprises tracking by the reaction system, relevant information of the user.

* * * * *